Figure 1:
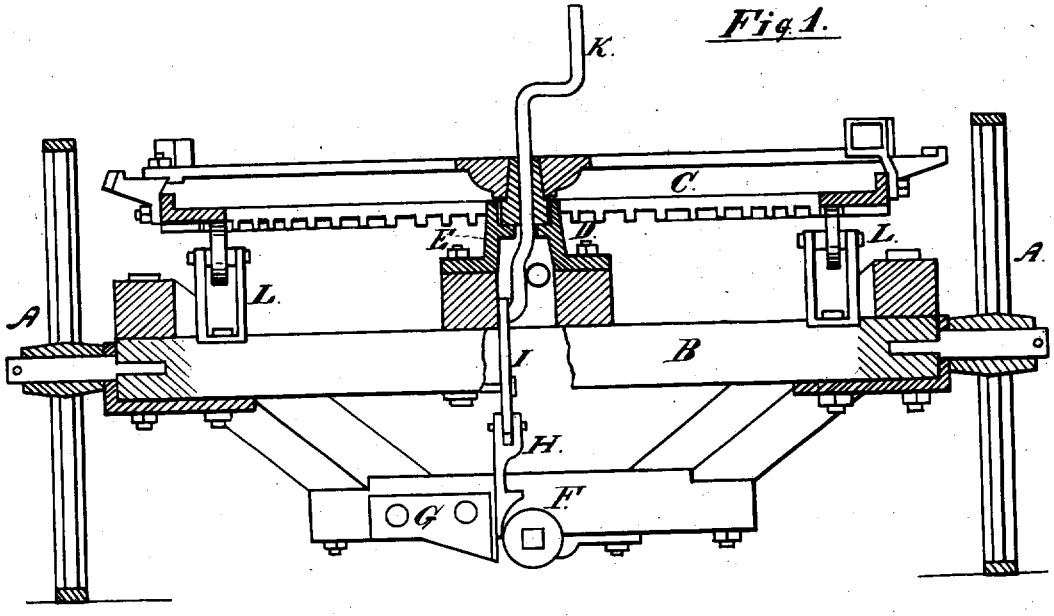

O. O. STORLE.

Assignor of one-half interest to J. O. OVERBY.

Horse-Power.

No. 8,476. Reissued Nov. 5, 1878.

Witnesses:

J. B. Smith

C. J. Smith

Inventor:

Ole O. Storle

N. PETERS, PHOTO-LITHOGRAPHER, WASHINGTON, D. C.

UNITED STATES PATENT OFFICE.

OLE O. STORLE, OF MILWAUKEE, WISCONSIN, ASSIGNOR OF ONE-HALF INTEREST TO JOHN O. OVERBY, OF SAME PLACE.

IMPROVEMENT IN HORSE-POWERS.

Specification forming part of Letters Patent No. 154,927, dated September 8, 1874; Reissue No. 8,476, dated November 5, 1878; application filed October 24, 1878.

*To all whom it may concern:*

Be it known that I, OLE O. STORLE, of Milwaukee, in the county of Milwaukee, in the State of Wisconsin, have invented certain Improvements in Horse-Powers, of which the following is a specification:

The object of my invention is to even the running of the master-wheel of a horse-power by setting the center-pin so that it may move a little sidewise, and thus permit the master-wheel to adjust itself in that direction, so that it shall work easy.

The drawing forming part of this specification shows a sectional view of a horse-power across the center of the master-wheel.

A A are the wheels of the horse-power; B, the axle-tree; C, the master-wheel; D, the pillow-block or bearing under the center of the master-wheel, lying on the axle-tree of the horse-power; and in this bearing or pillow-block is a hole for the center-pin, which pasess up through the master-wheel. This hole is oblong sidewise and just the width of the pin the other way, so that the pin may move a little sidewise and the master-wheel with it.

E is a hollow center-pin, with a shoulder on it standing on and passing into the bearing and passing up through the master-wheel; F, a roller attached to the tumbling-rod; G, a stud passing down from the frame; H, a brake, made in the form of a wedge; I, the shank of the brake passing up through the center-pin, with a handle, K, on its top. This brake, when used to stop or slacken the speed of the power, is thrust down and wedged in between the roller F, which is on the end of the tumbling-rod, and the stud G. L L are pinions, on which the master-wheel runs.

What I claim as new, and desire to secure by Letters Patent, is—

1. A horse-power with its master-wheel C set on a hollow center-pin, E, with slot in the pillow-block or bearing D, so that the wheel and pin can move sidewise in order to adjust the wheel without breaking, substantially as described.

2. A horse-power with brake H, holder F, stud G, and master-wheel C, in combination with hollow center-pin E, arranged substantially as described.

3. Master-wheel C, in combination with hollow center-pin E, substantially as described.

OLE O. STORLE.

Witnesses:

J. B. SMITH,

CARL BROSBACK.